Patented Nov. 9, 1943

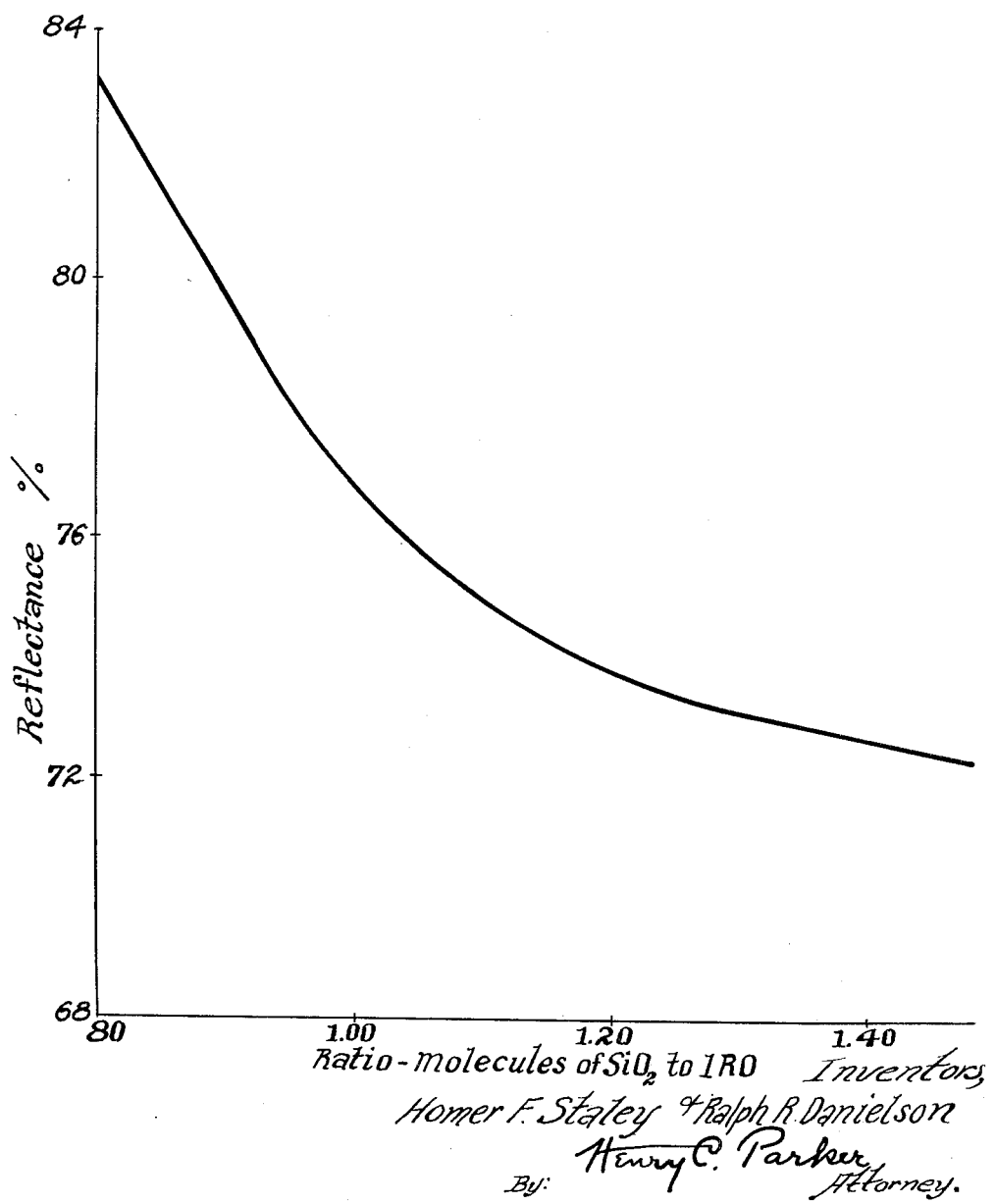

2,334,043

UNITED STATES PATENT OFFICE 2,334,043

ENAMELING COMPOSITION

Homer F. Staley and Ralph R. Danielson, Elizabeth, N. J., assignors to Metal & Thermit Corporation, New York, N. Y., a corporation of New Jersey Application September 7, 1940, Serial No. 355,859

11 Claims. (Cl. 106—49)

This invention relates to enameling compositions; and it comprises certain enamel frit compositions suitable for producing vitreous enamels and glazes of high opacity and reflectance and of brilliant gloss, said compositions containing from about 8 to 12 per cent by weight of zirconium oxide, a quantity of aluminum oxide amounting to at least about 2 per cent by weight and having a ratio of moles of silica to the sum of the basic monoxide equivalents available for combining therewith of less than 1:1, said compositions also advantageously containing from about 2 to 4 per cent of calcium oxide and/or zinc oxide, together with the other conventional ingredients used in making enamels of this general type. The invention also includes enamels produced from the described compositions; all as more fully hereinafter set forth and as claimed.

The use of zirconium oxide in enamel compositions in order to impart opaqueness has, of course, long been known. Many difficulties have been encountered in the production of these enamels, especially with respect to reproducibility and stability. Even when the frit maker has started with the same raw materials and has attempted to use the same procedure, erratic results have been obtained owing to inevitable variations in the smelting and firing procedures. In many of the frits made opaque by zirconium compounds as hitherto produced, the full potential capacity of the frit has not been developed in the smelting operation but has been dependent for its development on the further heat treatment during the enameling operation. The melted frit has had low opacity while the degree of opacity obtained in the enamel on a given piece of ware has been determined by the firing temperature attained by that particular piece and the time of exposure of the piece to that temperature. In general the higher the temperature of the piece and the longer the time of exposure, the greater the opacity. In plants making a variety of shapes and sizes of ware, wide variations in final opacity have occurred. Moreover, a considerable percentage of the ware has had to be given a second or even a third heat treatment. Such pieces have been more opaque than those given one heat treatment. It is obvious, of course, that procedures giving such wide variations in opacity in the finished ware have been very unsatisfactory.

The above difficulties have been attributed to too low a degree of opacity in the enamel and an attempt has been made to overcome them by the use of high proportions of zirconium oxide. In fact it has been considered necessary in the art to employ at least about 15 per cent of zirconium oxide in enameling compositions, containing this compound as the chief opacifying agent, for the production of reproducible and stable enamels having commercially acceptable reflectances, that is, reflectances of about 77 per cent or above. But in addition to the objection of the increased cost involved, it has been found that high percentages of $ZrO_2$ make the enamels brittle and more refractory.

In an extensive series of experiments we have discovered certain principles by means of which we are enabled to obtain enamel frits having accurately reproducible opacities and high gloss when ordinary commercial practices of frit melting are employed although containing only from about 8 to 12 per cent of zirconium oxide. Our experiments show that there are two important factors involved in obtaining reproducible opacities which, when properly controlled, enable the production of this type of enamel. These factors are (1) the enamel composition should contain a ratio of moles of $SiO_2$ to the sum of the basic monoxide equivalents available for combining with the silica which is below 1:1, and (2) the composition should contain at least about 2 per cent of $Al_2O_3$ and usually not more than about 10 per cent of this component. In addition we have found it advantageous to employ in the composition about 2 to 4 per cent of either calcium oxide or zinc oxide or both of these compounds. The other components of the composition may be those conventionally employed in enamels of this type.

The following specific examples show the importance of controlling the factors mentioned as well as showing how the necessary calculations are made to obtain the value of the ratio of the $SiO_2$ to the basic monoxide equivalents available to combine therewith.

The raw batch for this enamel frit contained the following ingredients:

| | Parts |
|---|---|
| Feldspar | 267.6 |
| Zircon | 150.0 |
| Flint | 41.5 |
| Potassium carbonate | 2.4 |
| Borax (anhydrous) | 201.4 |
| Sodium nitrate | 35.0 |
| Soda ash | 27.4 |
| Zinc oxide | 100.0 |
| Litharge | 60.1 |
| Fluorspar | 90.0 |
| Cryolite | 60.0 |

The feldspar used had the following percentage analysis: $SiO_2$—65.60; $Al_2O_3$—19.66; $K_2O$—11.06; $Na_2O$—3.34. The percentage analysis of the zircon was: $ZrO_2$—67; $SiO_2$—33.

Assuming that there is no decomposition of the fluorides during smelting of the above batch, the calculated melted composition of this enamel frit is shown in Table I, columns 1 and 2. The assumption that no decomposition of fluorides takes place is probably not quite exact with certain compositions and smelting procedures. However, the result of such decomposition would only be to make the melted frit somewhat more basic than is shown by our method of representation. By dividing the number of parts melted of each component by the molecular weight of that component we obtain the relative number of mols of each component present. This calculation is shown in columns 3 and 4 of Table I.

TABLE I

| 1<br>Components | 2<br>Parts melted | 3<br>Molecular weights | 4<br>Mols |
|---|---|---|---|
| $SiO_2$ | 267.1 | 60.1 | 4.44 |
| $B_2O_3$ | 140.0 | 69.6 | 2.01 |
| $Al_2O_3$ | 52.6 | 101.9 | 0.52 |
| $K_2O$ | 31.2 | 94.2 | 0.33 |
| $Na_2O$ | 99.0 | 62.0 | 1.60 |
| $ZnO$ | 100.0 | 81.4 | 1.23 |
| $PbO$ | 60.1 | 223.2 | 0.27 |
| $CaF_2$ | 90.0 | 78.1 | 1.28 |
| $Na_3AlF_6$ | 60.0 | 285.0 | 0.21 |
| $ZrO_2$ | 100.0 | 123.0 | 0.81 |
| | 1,000.0 | | |

In considering the proportions of basic and acidic ingredients in the bath, it is evident that we are interested in the combining weights or equivalents present rather than in molecular weights. We have found it convenient to express the content of the basic ingredients in the batch in terms of their monoxide equivalents, that is, the so-called "RO equivalents." This term may be defined as the sum of the monoxide equivalents of the basic oxides present in the batch which are capable of combining with $SiO_2$. In the case of the monovalent bases, such as potassium and sodium, which combine with silica in the ratios of 1 $Na_2O$:1 $SiO_2$ and 1 $K_2O$:1 $SiO_2$, the RO equivalents present in the batch are equal to the moles of $Na_2O$ and $K_2O$ present. But aluminum oxide combines with $SiO_2$ in the ratio of 1 $Al_2O_3$:3 $SiO_2$; hence the RO equivalents of alumina are three times the moles present. In Table II we have therefore listed the RO equivalents present in the batch, these values being derived from the data in Table I.

TABLE II

| Component | Mols | Atoms of oxygen | Monoxide equivalents or RO |
|---|---|---|---|
| $Al_2O_3$ | 0.52 | 3 | 1.55 |
| $K_2O$ | 0.33 | 1 | 0.33 |
| $Na_2O$ | 1.60 | 1 | 1.60 |
| $ZnO$ | 1.23 | 1 | 1.23 |
| $PbO$ | 0.27 | 1 | 0.27 |
| | | | 4.98 |

It is evident from the above table that 1 RO combines with 1$SiO_2$. In order to determine the RO equivalents present, which are available to combine with the silica, certain assumptions must be made with respect to the compounds which are formed in the batch between the alkali oxides and the acidic components present. Thus, it will be assumed that the $B_2O_3$ combines with the alkali oxides present in the ratio of 1 RO to 1 $B_2O_3$. The 2.01 moles of $B_2O_3$ present in the batch will then combine with 2.01 RO, which leaves a total of 2.97 RO which are still available to combine with the 4.44 $SiO_2$ present in the batch, assuming that the $CaF_2$ and the $Na_3AlF_6$ are not decomposed. The ratio of 4.44 $SiO_2$ to 2.97 RO is then 1.5:1. This ratio is the factor which we have found to be significant in determining the opacities and reflectances of enamels of this type and, as stated previously, this ratio should be below 1:1 in order to obtain a satisfactory reflectance.

When an enamel of the composition given in Table I was applied to an article by the dry process, in a weight corresponding to 360 g. per square foot and fired, it was found to have a reflectance of only 72.3 per cent.

In Table III the compositions, ratios of $SiO_2$ to available RO and reflectances of four additional enamels are given. The data in this table indicate clearly the important effect of the ratio of moles of silica to RO upon the reflectances of enamels of this type.

TABLE III

Data for enamels I-V

| | I | II | III | IV | V |
|---|---|---|---|---|---|
| | Per cent | Per cent | Per cent | Per cent | Per cent |
| $SiO_2$ | 26.71 | 25.63 | 24.30 | 23.65 | 23.65 |
| $B_2O_3$ | 14.00 | 14.00 | 14.00 | 11.46 | 8.35 |
| $Al_2O_3$ | 5.26 | 6.34 | 7.67 | 8.24 | 8.67 |
| $K_2O$ | 3.12 | 3.12 | 3.12 | 3.12 | 3.12 |
| $Na_2O$ | 9.90 | 9.90 | 9.90 | 9.90 | 11.90 |
| $ZnO$ | 10.00 | 10.00 | 10.00 | 10.00 | 10.00 |
| $PbO$ | 6.01 | 6.01 | 6.01 | 8.63 | 9.31 |
| $CaF_2$ | 9.00 | 9.00 | 9.00 | 9.00 | 9.00 |
| $Na_3AlF_6$ | 6.00 | 6.00 | 6.00 | 6.00 | 6.00 |
| $ZrO_2$ | 10.00 | 10.00 | 10.00 | 10.00 | 10.00 |
| | 100.00 | 100.00 | 100.00 | 100.00 | 100.00 |
| Mols of $SiO_2$ Available RO | 1.50 | 1.30 | 1.10 | 0.90 | 0.75 |
| Reflectance, per cent | 72.3 | 73.2 | 77.4 | 79.9 | 84.8 |

The accompanying drawing shows graphically the relationship between the reflectances of an enamel and its ratio of $SiO_2$ : available RO, the ratios being plotted as abscissas against the corresponding reflectances of several different enamels all of which have a ratio of $SiO_2$ to RO of 0.9, but which contain varying proportions of aluminum oxide.

TABLE IV

*Data for enamels VI–XII*

|  | VI | VII | VIII | IX | X | XI | XII |
|---|---|---|---|---|---|---|---|
| $SiO_2$ | 23.00 | 23.65 | 23.65 | 23.45 | 23.65 | 23.65 | 23.65 |
| $B_2O_3$ | 12.00 | 8.50 | 8.87 | 12.00 | 9.24 | 9.98 | 10.72 |
| $Al_2O_3$ | 0.00 | 0.00 | 1.03 | 1.13 | 2.06 | 4.12 | 6.18 |
| $K_2O$ | 0.00 | 3.12 | 3.12 | 0.00 | 3.12 | 3.12 | 3.12 |
| $Na_2O$ | 15.00 | 9.90 | 9.90 | 15.00 | 9.90 | 9.90 | 9.90 |
| ZnO | 12.80 | 10.00 | 10.00 | 12.80 | 10.00 | 10.00 | 10.00 |
| PbO | 0.00 | 8.63 | 8.63 | 0.00 | 8.63 | 8.63 | 8.63 |
| CaO | 11.20 | 11.20 | 9.80 | 9.62 | 8.40 | 5.60 | 2.80 |
| $CaF_2$ | 10.00 | 0.00 | 10.00 | 9.00 | 9.00 | 9.00 | 9.00 |
| $Na_3AlF_6$ | 6.00 | 6.00 | 6.00 | 6.00 | 6.00 | 6.00 | 6.00 |
| $ZrO_2$ | 10.00 | 10.00 | 10.00 | 10.00 | 10.00 | 10.00 | 10.00 |
|  | 100.00 | 100.00 | 100.00 | 100.00 | 100.00 | 100.00 | 100.00 |
| Reflectance_____per cent__ | One melt bright. 72.4 Three melts mat. | All melts mat. | All melts mat. | Two melts bright. 75.3 Three melts mat. | All melts bright. 82.1 | All melts bright. 82.0 | All melts bright. 83.2 | responding reflectances as ordinates. The curve shown represents the average of the results obtained in a number of different experiments in which the $ZrO_2$ content was maintained at 10 per cent while the proportions of the other ingredients were varied. It will be noted that there is a "knee" in the curve shown, that is, a point of maximum curvature, which falls at a point close to the ratio of 1:1. At points on the curve having ratios below 1:1, the reflectances increase more rapidly than at corresponding points having ratios above 1:1. It is therefore obvious from the curve that the ratio 1 $SiO_2$ : 1 RO represents a critical value below which a decrease in this ratio is more effective in producing an increase in reflectance. It happens that this critical value of the ratio occurs at a point at which the corresponding reflectance is close to 77 per cent which is about the minimum reflectance which is considered to be commercially acceptable. The curve of the drawing therefore shows that commercially acceptable reflectances can be obtained with enamels of this type containing only 10 per cent of zirconium oxide, provided that the ratio of moles of $SiO_2$ to the RO equivalents available for combining therewith is less than 1:1.

The fact that the increase in reflectance with decrease in the ratio of $SiO_2$ : RO is not linear is probably explained by the fact that, when this ratio is high, only a small part of the opacity of the enamel is derived from the $ZrO_2$ present, a large part being contributed by the fluorides in the composition. And, when the ratio is lower, the amount of opacity obtained at a given ratio is influenced to some extent by the kinds and relative amounts of the basic oxide equivalents making up the RO.

The second important factor which we have found effective in determining the reflectances of enamels is the quantity of $Al_2O_3$ present. This can be seen readily from an inspection of Table IV in which are shown the compositions and The term "bright" in Table IV is used to distinguish melts which are opaque and have measurable reflectances from those which are mat in texture. A melt may be bright but still have a low reflectance. The data in this table exemplify our discovery that, when the frits contain little or no aluminum oxide, the enamels have a decided tendency to become mat in texture and have low reflectances. With about two per cent or more of aluminum oxide in the composition all the enamels tested were found to possess bright finishes. The further increase in reflectance with increase of aluminum oxide above about two per cent is very gradual and hence this proportion is to a certain extent critical. It is our discovery that a minimum of about two per cent of aluminum oxide in the composition of the frit is necessary to stabilize the enamels in the glassy state so as to produce enamels with bright finishes.

It will be noted that enamel XII in the above table has a reflectance about 3 per cent higher than enamel IV in Table III. Our experiments show that this is due to the fact that enamel XII contains 2.8 per cent of calcium oxide while enamel IV contains no calcium oxide. We have found that the introduction of about 2 to 4 per cent of either calcium oxide or zinc oxide into enamel frit compositions, containing none of these oxides, in such manner as to keep the ratio $SiO_2$:RO constant, serves to increase the reflectance by about 3 per cent. Further additions have only a negligible effect. The effect of these oxides on the reflectance is independent. Our preferred compositions therefore contain from about 2 to 4 per cent of at least one or both of the oxides, calcium oxide and zinc oxide.

In Table V are given the data for four enamels containing percentages of $ZrO_2$ other than 10 per cent, which has been the amount of this component present in all of the examples previously presented.

Table V

Data for enamels XIII–XVI

|  | XIII | XIV | XV | XVI |
|---|---|---|---|---|
| $SiO_2$ | 24.05 | 23.25 | 23.65 | 22.94 |
| $B_2O_3$ | 11.35 | 10.89 | 8.83 | 8.35 |
| $Al_2O_3$ | 8.67 | 8.67 | 8.67 | 8.67 |
| $K_2O$ | 3.12 | 3.12 | 3.12 | 3.12 |
| $Na_2O$ | 9.90 | 9.90 | 11.90 | 11.90 |
| $ZnO$ | 10.00 | 8.86 | 10.00 | 8.71 |
| $PbO$ | 9.91 | 8.31 | 10.83 | 9.31 |
| $CaF_2$ | 9.00 | 9.00 | 9.00 | 9.00 |
| $Na_3AlF_6$ | 6.00 | 6.00 | 6.00 | 6.00 |
| $ZrO_2$ | 8.00 | 12.00 | 8.00 | 12.00 |
|  | 100.00 | 100.00 | 100.00 | 100.00 |
| Mols of $SiO_2$ / 1 RO | 0.89 | 0.89 | 0.75 | 0.75 |
| Reflectance per cent | 78.6 | 83.6 | 80.4 | 86.7 |
| Gloss | (1) | (1) | (1) | (1) |

[1] Brilliant.

It is evident that the data in Table V, when considered in connection with the results shown in Table IV, that it is possible to obtain enamels having a brilliant gloss and reflectances within the range of about 78 to 87 per cent which contain only about 8 to 12 per cent of $ZrO_2$ in their composition, provided that the principles of the present invention are followed. This is a result which could not be reliably secured prior to the present discoveries. Since in this class of enamels a reflectance of about 77 per cent or more is considered commercially acceptable and since any increase above a value of about 83 per cent has no commercial utility, it appears that it is possible with the aid of our invention to produce highly satisfactory enamels which have commercial utility and at a substantial saving in cost as well as with unexcelled reproducibility.

While our invention is particularly adapted to the manufacture of dry process enamels, the principles which we have discovered apply equally to the manufacture of all types of opaque enamels and glazes. Various modifications can be made in the specific compositions which have been described without departing from the purview of this invention. For example, while we have described the use of zirconium silicate in the raw batch, it is evident that zirconium compounds in general can be employed. Examples are the oxide and the carbonate. It will be understood, of course, that the claims which call for compositions containing various percentages of metal oxides refer to the analyses of the melted enamel frit rather than to the presence of these oxides as such. Modifications of our invention which fall within the scope of the following claims will be immediately evident to those skilled in this art.

What we claim is:

1. An opaque enameling or glazing composition capable of producing a finished enamel having commercially acceptable reflectance upon firing and comprising a fusible enamel frit having a molecular ratio of silica to the sum of the basic monoxide equivalents available for combining with the silica of up to but not exceeding 1:1, an aluminum oxide content of at least about 2 per cent by weight and a zirconium oxide content ranging from about 8 to 12 per cent by weight; said composition when fired producing an opaque coating of high gloss, stability and reproducibility having reflectancies within the range of about 78 to 87 per cent.

2. An opaque enameling or glazing composition capable of producing a finished enamel having commercially acceptable reflectance upon firing and comprising a fusible enamel frit having a molecular ratio of silica to the sum of the basic monoxide equivalents available for combining with the silica of up to but not exceeding 1:1, an aluminum oxide content ranging from about 2 to 10 per cent by weight and a zirconium oxide content ranging from about 8 to 12 per cent by weight; said composition when fired producing an opaque coating of high gloss, stability and reproducibility having reflectancies within the range of about 78 to 87 per cent.

3. An opaque enameling or glazing composition capable of producing a finished enamel having commercially acceptable reflectance upon firing and comprising a fusible enamel frit having a molecular ratio of silica to the sum of the basic monoxide equivalents available for combining with the silica of up to but not exceeding 1:1, an aluminum oxide content of not substantially less than 2 per cent by weight, a $ZrO_2$ content ranging from about 8 to 12 per cent and from about 2 to 4 per cent by weight of at least one metal oxide selected from the group consisting of calcium and zinc oxides; said composition when fired producing an opaque coating of high gloss, stability and reproducibility having reflectancies within the range of about 78 to 87 per cent.

4. The composition of claim 3 wherein the metal oxide is calcium oxide.

5. The composition of claim 3 wherein the metal oxide is zinc oxide.

6. The composition of claim 3 wherein the aluminum oxide content is up to about 10 per cent by weight.

7. The composition of claim 3 wherein both calcium and zinc oxides are present in amounts ranging from about 2 to 4 per cent by weight.

8. An opaque, fired enamel having a reflectancy within the range of about 78 to 87 per cent, comprising from about 8 to 12 per cent of zirconium oxide and an aluminum oxide content of at least about 2 per cent by weight, and containing silica together with basic monoxide equivalents available for combining with the silica in a molecular ratio of up to but not exceeding 1:1.

9. The enamel of claim 8 wherein the aluminum oxide content is within the range of about 2 to 10 per cent by weight.

10. The enamel of claim 8 including in its composition from about 2 to 4 per cent of at least one metal oxide, selected from the group consisting of calcium and zinc oxides.

11. The enamel of claim 8 including in its composition from about 2 to 4 per cent of calcium and zinc oxides.

HOMER F. STALEY.
RALPH R. DANIELSON.